United States Patent
Kubli

(10) Patent No.: US 8,463,583 B2
(45) Date of Patent: Jun. 11, 2013

(54) SIMULATED DESIGN OF FORMED SHEET-METAL PARTS WITH THINNING AND THICKENING EFFECTS

(76) Inventor: Waldemar Kubli, Neerach (CH)

( * ) Notice: Subject to any disclaimer, the term of this patent is extended or adjusted under 35 U.S.C. 154(b) by 137 days.

(21) Appl. No.: 12/948,531

(22) Filed: Nov. 17, 2010

(65) Prior Publication Data

US 2012/0123741 A1     May 17, 2012

(51) Int. Cl.
*G06G 7/64*   (2006.01)
*G06F 19/00*  (2011.01)

(52) U.S. Cl.
USPC .............. 703/6; 700/97; 700/118; 700/145

(58) Field of Classification Search
None
See application file for complete search history.

(56) References Cited

U.S. PATENT DOCUMENTS

| | | | |
|---|---|---|---|
| 6,353,768 B1 * | 3/2002 | Karafillis et al. | 700/97 |
| 2008/0004850 A1 * | 1/2008 | Wang | 703/13 |
| 2008/0243442 A1 * | 10/2008 | Kubli et al. | 703/1 |
| 2011/0218778 A1 * | 9/2011 | Klimmek | 703/2 |
| 2012/0123579 A1 * | 5/2012 | Kubli et al. | 700/104 |

FOREIGN PATENT DOCUMENTS

| WO | WO 2005103850 A1 * | 11/2005 |
|---|---|---|
| WO | WO-2010-033929 | 3/2010 |

OTHER PUBLICATIONS

Dictionary.com, "relative" <http://dictionary.reference.com/browse/relative>.*

J.L. Batoz, H.Naceur, and Y.Q. Guo "Formability Predictions in Stamping and Process Parameter Optimization Based on the Inverse Approach Code Fast_Stamp" AIP Conf. Proc. 778, 831 (2005); doi 10.1063/1.2011325.*

Kaulich, Christoph and Wenzlaff, Michael, "IndiForm—Eine intuitive Bedienoberfläche für die industrielle Umformsimulation" ("IndiForm—An intuitive graphical user interface for industrial simulation of forming operations"), LS-DYNA Forum, Bamberg 2010, Metallumformung III, GNS mbH, published in Bamberg, Germany; online version available as of Mar. 30, 2011 at http://www.dynamore.de/dokumente/papers-1/2010-deutsches-forum/papers/C-III-03.pdf?set_language=de.

Anderson, Taylor, "Automating the Design Validation Process with NX Check-Mate", Desktop Engineering, vol. 14, Issue 9, May 2009; online version available as of Mar. 30, 2011 at http://www.deskeng.com/articles/aaapyy.htm.

NX Checker, Siemens PLM Software, 2008; online version available as of Mar. 30, 2011 at http://www.plm.automation.siemens.com/de_de/Images/checker_tcm73-62406.pdf.

(Continued)

*Primary Examiner* — Kamini S Shah
*Assistant Examiner* — Jay B Hann
(74) *Attorney, Agent, or Firm* — Albert Haegele; Leyendecker & Lemire, LLC

(57) ABSTRACT

In a method for designing a formed sheet-metal part, a method for displaying a visual representation of the quality of the formed sheet-metal part, the method comprising the steps of:
  simulating the deformation of the part by a forming process of the part, thereby computing thinning and thickening effects of the forming process on the part, for different values of a restraining force;
  displaying a visual representation of the part and of the thickening and thinning effects of different regions of the part;
  classifying the surface of the part as having several regions, each region being associated with a particular range of the thickening and thinning effects;
  computing and displaying on the display device a diagram displaying, as a function of the restraining force, the relative size of areas of these regions.

12 Claims, 2 Drawing Sheets

OTHER PUBLICATIONS etaDYNAFORM User's Manual Version 5.5, Chapter 8, Engineering Technology Associates, Inc., Troy, Michigan (US), 2006; online version available as of Mar. 30, 2011 at http://www.dynamore.de/documents/manuals/eta-dynaform-manuals/archiv/dynaform-5.5-user-manual?set_language=en.

Miller, B. and Bond, R., "The practical use of simulation in the sheet metal forming industry", Wilde FEA Ltd., 2001, XP002621095; online version available as of Mar. 30, 2011 at http://citeseerx.ist.psu.edu/viewdoc/summary?doi=10.1.1.118.813.

Shi X et al., "Simulation of sheet metal forming by a one-step approach: Choice of element", Journal of Materials Processing Technology 20010117 Elsevier Science S.A., vol. 108, No. 3, Jan. 17, 2001, pp. 300-306, XP002621096, DOI: DOI:10.1016/S0924-0136(00)00846-3.

Wang Y, et al., "Research on applying one-step simulation to blank design in sheet metal forming", Journal of Materials Processing Technology 20020115 Elsevier Ltd GB, vol. 120, No. 1-3, Jan. 15, 2002, pp. 111-114, XP002621097, DOI: DO1:10.1016/S0924-0136(01)01197-9.

European Search Report No. EP 10 40 5221, Feb. 8, 2011, Munich, Germany.

European Search Report No. EP 10 40 5222, Feb. 8, 2011, Munich, Germany.

* cited by examiner

US 8,463,583 B2

SIMULATED DESIGN OF FORMED SHEET-METAL PARTS WITH THINNING AND THICKENING EFFECTS

CROSS-REFERENCE TO RELATED APPLICATIONS

U.S. patent application Ser. No. 12/948,555, entitled "Method and System for Processing and Displaying Sheet-Metal-Forming Simulation Parameters", and U.S. patent application Ser. No. 12/948,581, entitled "Method and Computing System for Designing a Sheet-Metal-Forming Process", each having at least one common inventor with this patent application, and being commonly owned with this patent application, were filed concurrently with this patent application, and accordingly, are incorporated by reference herein for all purposes.

BACKGROUND

Formed metal parts and in particular formed sheet-metal parts are manufactured in multi-component forming presses by deep drawing, restriking, folding, trimming, etc., involving different forming tools.

For the configuration of metal forming tools (for example, punches, dies, and blank holders), as well as for the configuration of metal forming processes (for example, tool forces, draw beads, lubrication, shape, and material for the sheet-metal blank), CAD/CAE (computer aided design/computer aided engineering) programs are utilized. These simulate and model, respectively, a metal forming process by means of finite elements on the basis of simulation parameters. Simulation parameters describe

- the geometry or shape of the forming tools utilized in the metal-forming process,
- process parameters or metal-forming parameters, such as the lubrication, processing forces, etc.
- material parameters of the material being formed, such as thickness, rolling direction, physical characteristics etc.

The simulation programs create, by numerical simulation, result values comprising a description of the geometry of a sheet-metal part after the forming process as well as the distribution of state variables, such as elongations and stresses in the formed sheet-metal part. They also may calculate, from the result values, values of certain characteristic variables, called performance variables, which express a quality of the formed sheet-metal part. Different types of performance variables and visual representations of the result values and performance variables can be computed and displayed in a post-simulation analysis. Correspondingly, further sets of parameters are used to control the numerical simulation itself (control parameters) and to control different types of post-simulation analysis (analysis parameters).

An important parameter in forming processes is the restraining force since it affects the flow of material in most areas of the part being formed. The restraining force is the force restraining the material of the part being pulled and stretched, from one or more areas of the part being held back by a blank holder, into the desired shape during the forming process. The restraining force may vary along the outer circumference of the part (and also at inner regions of the part being held by blank holders) and is influenced by a combination of the blank holder force(s), the arrangement of draw beads, and also by the shape of an addendum to the part, where such an addendum is arranged, etc. If the restraining force in a particular area of the part is too large, the material may thin out and tear, if it is too small, the material may be compressed (which may result in wrinkles or bad surface appearance). Depending on the geometry of the part, both of these undesired effects may arise in different areas of the part, so it may be necessary to find a middle value for the restraining force which minimizes the total risk of thinning and thickening. In order to do this, one may repeatedly perform a numerical simulation of a forming process, as described above, thereby varying the restraining force and other important parameters in order to find a set of parameters that gives a satisfactory result. However, this procedure is time-consuming due to the required computing power, and requires a lot of forming technology expertise.

There is a need to assist users with the choice of process parameters, in particular with the choice of restraining force.

BRIEF SUMMARY

Many of the embodiments described herein are generally directed to a method and computing system for designing a formed sheet-metal part of the type mentioned initially, which overcomes the disadvantages mentioned above.

The method for designing a formed sheet-metal part is performed by a processor of a computing system, by means of a numerical model of a target geometry of the part being modified interactively by a user. It comprises a method for displaying a visual representation of the quality of the formed sheet-metal part, comprising the steps of:

maintaining in computer storage the numerical model of the target geometry of the part being modified;

by the computing system, performing a simulation procedure,
  wherein the deformation of the part by a forming process that transforms the part from an initial geometry to the target geometry is computed,
  wherein thinning and thickening effects of the forming process on the part are computed as a function of restraining force, and
  wherein the computation steps for the part deformation and the part thinning and thickening effects are repeated for different values of the restraining force;

on the display device, displaying a visual representation of the part subjected to the simulated forming process, including a visual representation of the thickening and thinning effects on the visual representation of regions of the part that are affected by said thickening and thinning effects;

by the computing system, classifying the surface of the part as having several regions,
  wherein each region is associated with a particular range of the thickening and thinning effects, and
  wherein for each of these regions, a value that is representative of the area of the region is computed; and by the computing system, computing and displaying on the display device a diagram displaying the relative size of the values that are representative of the areas of these regions, as a function of the restraining force.

A value that is representative of the area of a region can be computed as the surface area of this region on the part, or as an equivalent value such as the volume of the region, and/or as an approximation, obtained e.g. by counting grid or raster points of the computational model. For the sake of simplicity, the term "area" shall be used for such representative values as well.

As a result, it now is possible to simulate, in the initial design phase of the shape of a formed part, in a simplified computation procedure, the essential effect of the restraining force on the quality of the formed part after the forming process. A visual representation of the conflicting quality aspects related to thickening and thinning effects is provided, which allows a user to assess whether the overall quality is sufficient and, should it not be sufficient, provides guidance as to how the design should be modified in order to improve overall quality.

The term "thickening effects" is used in the present application as a summary for the effects of a (locally) too small restraining force, such effects being, with increasing order of severity: insufficient stretching, compression, thickening of the sheet-metal material. Corresponding regions of the part, in which such effects are expected to occur, according to the simulation, are called risk regions related to thickening. Note that the term "thickening effects" does not necessarily mean that the material becomes thicker in each case; in particular it also includes thinned regions with insufficient stretching or with compression.

The term "thinning effects" is used in the present application as a summary for the effects of a (locally) too large restraining force, such effects being, with increasing order of severity: risk of splitting, excessive thinning, tearing or splitting of the sheet-metal material. Corresponding regions of the part, in which such effects are expected to occur, according to the simulation, are called risk regions related to thinning. Note that the term "thinning effect" does not necessarily mean that the material becomes thinner in each case; in particular it also includes cracks in thickened regions.

The method can be used by the designer of a part who knows about the basic issues related to thinning and thickening, but should not be bothered with details of the forming process design, which will be considered at a later stage by a tool designer. It is sufficient if the user receives an approximate indication of the feasibility of the part, and, if the risks in forming the part are too high, receives information about where and how the part may be modified in order to improve manufacturability.

By means of the inventive method and system, the user can quickly assess the risks involved in the forming of the part, and can decide, according to the quality requirements he is given, whether there is, in principle, a restraining force with which the part can be formed without too much total risk due to thinning and thickening. If this is not the case, the diagram gives an indication whether it is advisable and possible to decrease the size of the thinning-related or of the thickening-related risk regions. After modification of the target geometry, the diagram allows a designer to check the new distribution of the areas of the risk regions and to determine whether there now is an acceptable restraining force.

In an embodiment, the diagram plots, along a first axis, the varied restraining force, and along a second axis, for each value of the varied restraining force, the relative sizes of the regions. This is preferably done in a sequence ordered according to the degree of the thickening and thinning effect, beginning with areas exhibiting the most thickening and ending with areas exhibiting the most thinning, or vice versa. As a result, the diagram shows a series of bands, one above the other, each corresponding to a particular type or degree of risk associated with thickening and thinning. For each value of the restraining force, the width (or height, depending on point of view) of the band shows the relative size of the regions associated with the different risks, or being classified as "safe"; that is, without a particular risk classification.

In an embodiment, a number of simulations for different restraining forces are performed, the areas of the different risk regions are computed, and further values of areas are computed by interpolating them over the restraining force.

In an embodiment, the method comprises the further step of automatically determining an optimum of the varied restraining force as a function of at least one of an upper limit and a lower limit for the restraining force. The upper limit is the largest restraining force for which no thinning effects occur or the area or magnitude of thinning effects does not exceed a predetermined limit, the lower limit is the smallest restraining force for which no thickening effects occur or the area or magnitude of thickening effects does not exceed a predetermined limit. For example, the optimum is determined by selecting the smallest restraining force for which the relative size of an area that is classified as being safe exceeds a predetermined value, such as one third of the total area of the part (in general "predetermined" values are determined e.g. by user preferences or by manufacturers guidelines). In another embodiment, the optimum is determined as the highest restraining force for which no cracks appear, or no thinning effects occur. In another embodiment, the optimum is determined as the average of the largest restraining force for which no thinning effects occur and the smallest restraining force for which no thickening effects occur. If the latter is larger than the former, then the latter may be chosen.

In an embodiment, the step of the simulation module performing the simulation procedure comprises the simulation module performing a reverse one-step simulation which computes the deformation from the target geometry of the part after the forming process to the initial geometry of the part prior to the forming process, and thereby computes the thinning and thickening effects of the forming process on the part. The initial geometry typically is that of a flat sheet-metal blank.

In an embodiment, the simulation is performed with the varied restraining force being applied around the complete circumference of the part.

In another embodiment, the varied restraining force is applied to one or more predetermined sections of the circumference only, the restraining force in the remaining sections being assumed to have a constant value, in particular a value of zero. This allows a designer to work with parts having several separate blank holders, or with parts that are held only along part of the circumference or to take draw beads and other measures for changing the restraining forces into account.

In an embodiment, the part comprises holes. When manufacturing the part, an inner blank holder is arranged around the hole, holding the sheet metal during the forming process. Correspondingly, in the simulation the effect of the inner blank holder is simulated as well. The circumference of the part then can be considered to comprise both the outer circumference and the (inner) circumferences of one or more holes. The force for this inner blank holder may be the same as and varied along with the varied restraining force of the outer blank holder. Alternatively, the force for this inner blank holder may equal a constant force (zero force corresponding to no inner blank holder being present).

In an embodiment, a computer program product for the simulation of sheet-metal-forming processes is loadable into an internal memory of a digital computer or a computer system, and comprises computer-executable instructions to cause one or more processors of the computer or computer system execute the simulation method. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims.

Nothing in the above brief summary is intended to limit the scope of the patent claims, or limit the scope of the balance of this specification.

BRIEF DESCRIPTION OF THE DRAWINGS

The subject matter of the invention will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
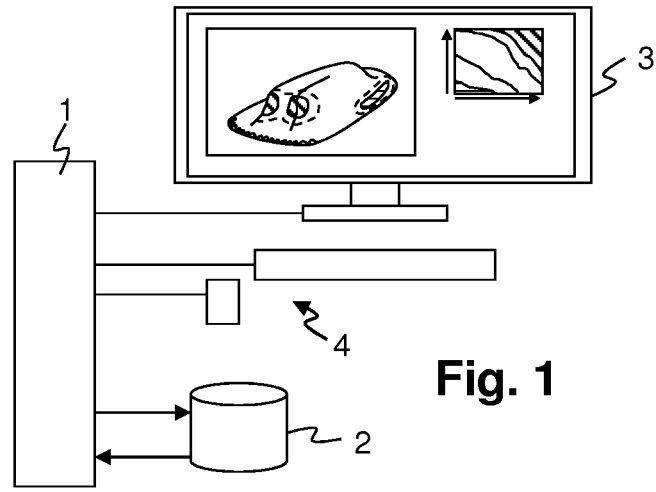
FIG. 1 schematically shows a structure of an embodiment of a sheet-metal part designing system.

FIG. 1 schematically shows a structure of an embodiment of a computing system for designing a formed sheet-metal part; with a processing unit 1 operatively coupled to a display 3 and a persistent storage unit 2, as well as input devices 4 such as a keyboard and/or pointing device, such as a computer mouse. The processing unit 1 comprises a processor and random access memory.

Figure 2:
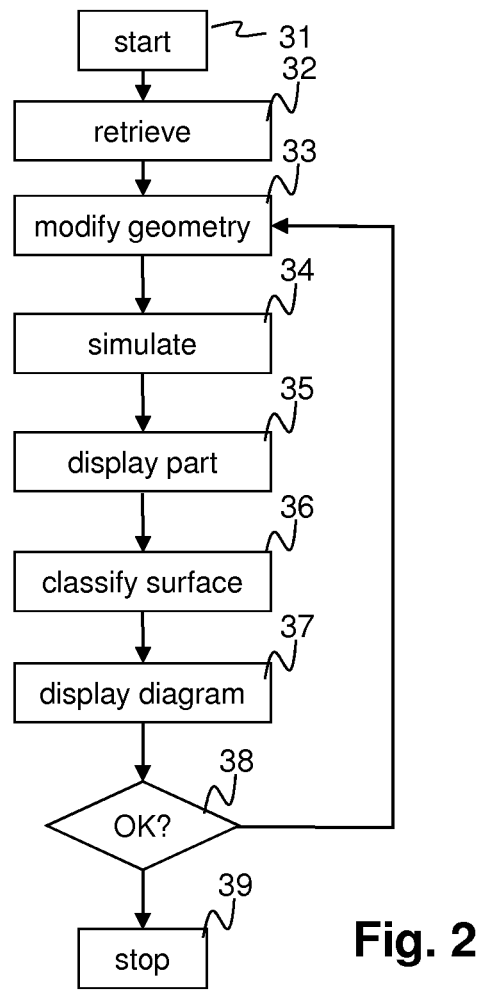
FIG. 2 shows a flow diagram of an embodiment of a sheet-metal part designing process.

The computer system is programmed to execute, among others, a method for designing a formed sheet-metal part, according to the flow diagram of FIG. 2. The method steps displayed therein take place as one sub-part of a complete part design procedure. After a start and initialization step 31, in a retrieval and preparation step 32 a user of the computer system, interactively designs or loads from memory a numerical model of a formed sheet-metal part. In a further step 33 the user may modify the modeled geometry. This modeled geometry is the target geometry of a sheet-metal part that is to be formed by deforming the part, starting from an initial geometry. In step 34, a simulation of the part deformation corresponding to this forming process that generates the target geometry is performed. The simulation determines among others, characteristic variables or performance variables such as the thickening and thinning of the part by the forming process. In step 35, a visual representation of the part in the target geometry is computed and displayed, including a visualization of the values of the performance variables overlaid onto the depiction of the part, which allows showing part regions in which the performance variables have predetermined values or lie within predetermined ranges. These values or ranges preferably have been specified according to the material of the part, or are entered by the user. In step 36, the points of the part, typically points on the surface of the part, are classified as belonging to one of several regions, wherein each region is associated with a particular value or range of the performance variables, and the area of each of these regions is computed. In step 37, a diagram is computed and displayed, the diagram showing the relative size or areas of these part regions. In step 38, according to user input, the method may branch back to allow the further, iterative modification of the target geometry according to step 33, or may branch to the termination 39 of this aspect of the part-design procedure.

Figure 3:
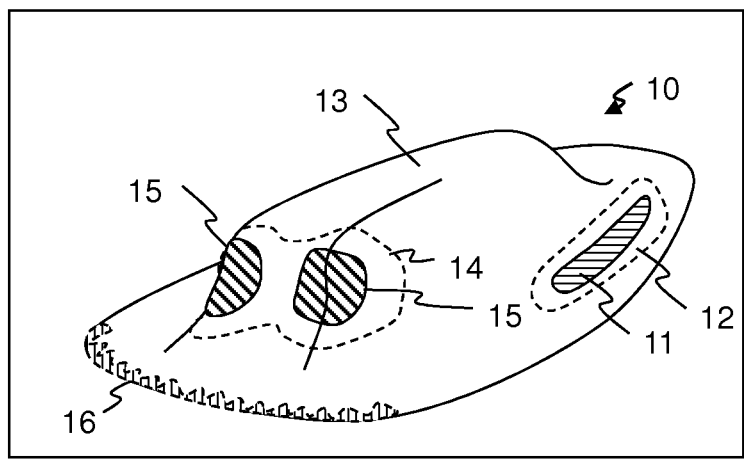
FIG. 3 schematically shows the display of a formed part.

FIG. 3 schematically shows a visualization of a formed part 10 as computed in step 34 and displayed on display 3. The visualization of the formed part 10 comprises overlays, typically in color (represented in FIG. 3 by hatching), indicating that a predetermined performance variable, on the corresponding region of the part, lies within a predetermined range. In the present example, the performance variable indicates thinning and thickening effects, and the related regions are:

a first region 11 in which the simulation shows a thickening or a compression of the sheet metal to take place;
a second region 12 in which insufficient stretching takes place;
a third region 13, classified as "safe";
a fourth region 14, in which excessive thinning takes place;
a fifth region 15, in which tearing or splitting of the material takes place.

The first, second, fourth and fifth regions are considered to be "risk regions". The third, "safe" region is the remainder of the part, in which neither unsafe thinning nor unsafe thickening takes place.

One or more sixth regions 16 may exist in edge regions of the part, in which the simulation shows excessive thinning or splitting. Such regions usually are artifacts of the simulation procedure and do not correspond to an actual risk in the real part. For this reason, in an embodiment of the invention, edge regions of the part are not displayed as being the risk region computed by the simulation, but are classified and displayed (colored, e.g.) in the same way as the area of the part lying inwards of the respective edge region, or are completely excluded from classification and not taken into account in the further evaluations. The width of an edge region may be automatically chosen; e.g., as a predetermined multiple of the material thickness.

Figure 4:
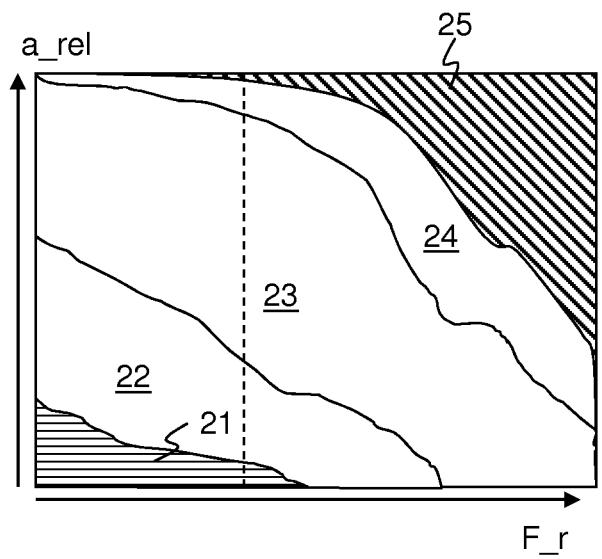
FIGS. 4, 5 schematically shows the display of a diagram showing relative size of regions of the part having predetermined characteristics as a function of a varied restraining force.

While the display according to FIG. 3 shows the spatial distribution of risk areas on the part for a single value of the restraining force, the display depicted in FIG. 4 allows for an assessment of the influence of varying restraining force on risk areas:

FIG. 4 schematically shows the display of a diagram showing the relative size a_rel of areas of the regions of the part having predetermined characteristics as a function of a varied restraining force $F\_r$. A first 21, second 22, third 23, fourth 24, and fifth band 25 indicate the relative area of the respective regions on the part, for varying $F\_r$. Along a vertical line, such as the dashed line, the relative size of these regions, for one particular value of $F\_r$, is visible. It is immediately evident, going from left to right along the horizontal axis, that for the smallest $F\_r$, there is no significant tearing, but a large area with thickening-related risk. With increasing $F\_r$, the proportion of thickening-related risks 21, 22 decreases while the proportion of thinning-related risks 24, 25 increases. It is further immediately visible whether there exists a value of $F\_r$ for which there is an acceptable tradeoff between thinning and thickening risks, or whether the part geometry needs to be redesigned.

For example, manufacturer guidelines for a particular product may stipulate that the area labeled as "safe" should be at least 30%, that the area of the first region should be less than 10%, and that the area of the fifth region 15 should be less than 2%. In view of the diagram of FIG. 4, the user may choose to unsharpen the shape of the part 10 in the fifth regions 15 (e.g. by increasing the part fillet radii). He will expect this to cause, for most restraining force values, a reduction of the size of the fifth regions 15 and presumably also of the fourth region 14.

Figure 5:
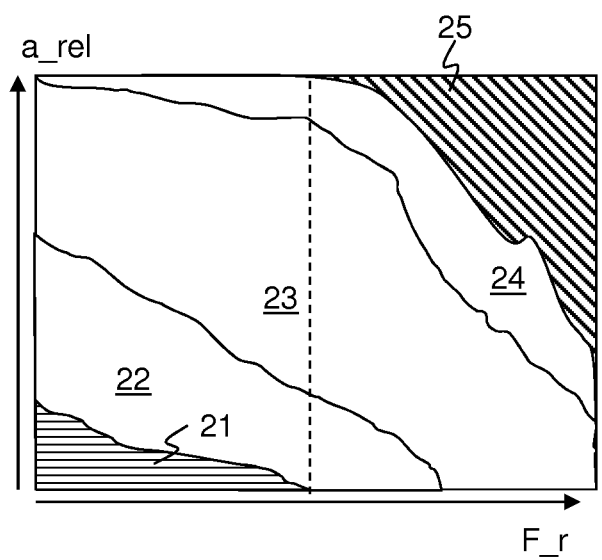

FIG. 5 shows the diagram of FIG. 4 after such a change to the part geometry: The dividing lines between the third band 23 and fourth band 24 and between the fourth band 24 and fifth band 25 have moved upwards, corresponding to the fact that the unsharpened part has less of a tendency towards thinning and splitting. A vertical dashed line corresponding to a restraining force with an acceptable overall risk has moved to the right, to higher restraining forces, and the associated distribution of risks comprises hardly any risk of thickening (corresponding to the first band 21) or of splitting (fifth band 25).

While the invention has been described in present embodiments of the invention, it is distinctly understood that the invention is not limited thereto, but may be otherwise variously embodied and practiced within the scope of the claims. For example, instead of classifying the area into five types of regions, with five associated bands in the diagram, three or seven or more regions may be used.

What is claimed is:

1. In a method for designing a formed sheet-metal part, performed by a processor of a computing system, by means of a numerical model of a target geometry of the part being modified interactively by a user, a method for displaying a visual representation of the quality of the formed sheet-metal part, the method comprising the steps of:
maintaining in computer storage the numerical model of the target geometry of the part being modified;
by the computing system, performing a simulation procedure,
wherein deformation of the part by a forming process that transforms the part from an initial geometry to the target geometry is computed,
wherein thinning and thickening effects of the forming process on the part are computed as a function of restraining force, and
wherein the computation steps for the part deformation and the part thinning and thickening effects are repeated for different values of the restraining force;
on a display device, displaying a visual representation of the part subjected to the simulated forming process, the visual representation of the part including a an image of a surface of the part and multiple regions of the surface of the part;
wherein each of the multiple regions is defined by the thickening and thinning effects that reside within a predetermined range; and
wherein for the each of the multiple regions, an entire surface area of the region is computed; and
by the computing system, computing and displaying on the display device a diagram displaying relative sizes of the entire surface areas of the each of the multiple regions, plotted against the restraining force.

2. The method of claim 1, comprising the step of, by the computing system, plotting in the diagram, along a first axis, the restraining force, and along a second axis, for each value of the restraining force, the relative sizes of the entire surface areas of the each of the multiple regions.

3. The method of claim 1, comprising the step of, by the computing system, plotting the relative sizes of the regions in a sequence ordered according to the degree of the thickening and thinning effect, beginning with regions exhibiting the most thickening and ending with regions exhibiting the most thinning or beginning with regions exhibiting the most thinning and ending with regions exhibiting the most thickening.

4. The method of claim 2, comprising the further step of, by the computing system, automatically determining an optimum of the restraining force as a function of at least one of an upper limit and a lower limit for the restraining force.

5. The method of one of claims 1 to 4, wherein, in the simulation of the forming process, the restraining force being varied is simulated to apply to an entire circumference of the part.

6. The method of one of claims 1 to 4, wherein, in the simulation of the forming process, the restraining force being varied is simulated to apply to predetermined sections of the circumference of the part only, with the restraining force in the remaining sections being assumed to have a constant value of zero.

7. A method for visually displaying parameters of simulated formation of a sheet-metal part, comprising:
storing on non-transitory computer readable medium, a numerical model of a target geometry of the part;
performing the simulated formation of the part, using a computing system processor, said performing the simulated formation of the part including:
simulating transformation of the part from an initial geometry to the target geometry;
determining thinning and thickening effects that occur during said simulated transformation, said determining thinning and thickening effects being performed at multiple levels of restraining force;
displaying a visual representation of the part, wherein the visual representation includes an image of the part upon which spatial distribution of multiple discrete regions are depicted, each of the multiple discrete regions consisting of areas of the part in which thinning and thickening effects reside within a predetermined range for at least one of the multiple levels of restraining force; and
displaying a diagram wherein a relative size of each of the multiple discrete regions resides on a first axis, and the multiple levels of restraining force reside on a second axis.

8. The method of claim 7, wherein said determining thinning and thickening effects is performed by a reverse simulation that computes deformation from the target geometry to the initial geometry.

9. The method of claim 8, wherein said reverse simulation is a one-step simulation.

10. A non-transitory computer readable medium comprising computer-executable instructions, which when executed by a processor of a computing system, cause the computing system to perform a method for visually displaying parameters of simulated formation of a sheet-metal part, the method comprising:
storing on non-transitory computer readable medium, a numerical model of a target geometry of the part;
performing the simulated formation of the part, using a computing system processor, said performing the simulated formation of the part including:
simulating transformation of the part from an initial geometry to the target geometry;
determining thinning and thickening effects that occur during said simulated transformation, said determining thinning and thickening effects being performed at multiple levels of restraining force;
displaying a visual representation of the part, wherein the visual representation includes an image of the part upon which spatial distribution of multiple discrete regions are depicted, each of the multiple discrete regions including areas of the part in which thinning and thickening effects reside within a predetermined range for at least one of the multiple levels of restraining force; and displaying a diagram wherein a relative size of each of the multiple discrete regions resides on a first axis, and the multiple levels of restraining force reside on a second axis.

11. The non-transitory computer readable medium of claim 10, wherein the method further comprises the multiple levels of restraining force being simulated to apply to an entire circumference of the part.

12. The non-transitory computer readable medium of claim 10, wherein the method further comprises the multiple levels of restraining force being simulated to apply only to predetermined sections of the circumference of the part, and the restraining force in remaining sections of the part being held fixed at zero.

* * * * *